United States Patent
Kuwamura

(10) Patent No.: US 11,074,012 B2
(45) Date of Patent: Jul. 27, 2021

(54) STORAGE DEVICE, INFORMATION PROCESSING SYSTEM, AND NON-TRANSITORY COMPUTER-READABLE STORAGE MEDIUM FOR STORING PROGRAM

(71) Applicant: FUJITSU LIMITED, Kawasaki (JP)

(72) Inventor: Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/368,935

(22) Filed: Mar. 29, 2019

(65) Prior Publication Data

US 2019/0324692 A1 Oct. 24, 2019

(30) Foreign Application Priority Data

Apr. 24, 2018 (JP) .............................. JP2018-083044

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 12/0246* (2013.01); *G06F 2212/7202* (2013.01)

(58) Field of Classification Search
CPC .... G06F 3/0659; G06F 3/061; G06F 12/0246; G06F 2212/7202; G06F 3/0679
See application file for complete search history.

(56) References Cited

U.S. PATENT DOCUMENTS

| | | | |
|---|---|---|---|
| 7,480,766 B2 * | 1/2009 | Gorobets | G06F 3/0607 711/115 |
| 9,053,790 B1 * | 6/2015 | Hu | G11C 13/0035 |
| 2010/0174951 A1 * | 7/2010 | Yamashita | G06F 12/0246 714/54 |
| 2013/0073784 A1 * | 3/2013 | Ng | G06F 12/0246 711/103 |
| 2014/0379963 A1 | 12/2014 | Kazama | |
| 2015/0067243 A1 * | 3/2015 | Salessi | G06F 12/0246 711/103 |

(Continued)

FOREIGN PATENT DOCUMENTS

| | | |
|---|---|---|
| JP | 2003-203486 | 7/2003 |
| JP | 2010-160605 | 7/2010 |

(Continued)

OTHER PUBLICATIONS

Jaeyoung Do et al., "Query Processing on Smart SSDs: Opportunities and Challenges", SIGMOD '13, 2013 ACM SIGMOD International Conference on Management of Data, pp. 1221-1230, Jun. 22-27, 2013 (10 pages).

*Primary Examiner* — Francisco A Grullon
(74) *Attorney, Agent, or Firm* — Fujitsu Patent Center

(57) ABSTRACT

A storage device includes: a semiconductor memory; and a memory controller coupled to the semiconductor memory and configured to control the semiconductor memory, wherein the memory controller is configured to store information for translating a logical address into a physical address, and execute a dividing process that includes dividing, upon receiving a computational command, the computational command into a plurality of commands based on the information.

6 Claims, 8 Drawing Sheets

(56) References Cited

U.S. PATENT DOCUMENTS

| | | | |
|---|---|---|---|
| 2015/0378886 A1* | 12/2015 | Nemazie | G06F 3/0619 |
| | | | 711/103 |
| 2016/0328150 A1* | 11/2016 | Park | G06F 3/061 |
| 2017/0308319 A1* | 10/2017 | Suzuki | G06F 12/0246 |
| 2018/0011663 A1 | 1/2018 | Kuwamura | |
| 2018/0067810 A1* | 3/2018 | Li | G06F 11/142 |
| 2018/0088841 A1* | 3/2018 | Ma | G06F 3/0688 |
| 2019/0051324 A1* | 2/2019 | Zhao | G06F 3/0616 |

FOREIGN PATENT DOCUMENTS

| | | |
|---|---|---|
| JP | 2015-7843 | 1/2015 |
| JP | 2018-5686 | 1/2018 |

* cited by examiner

| LOGICAL ADDRESS (HEXADECIMAL NOTATION) | PHYSICAL ADDRESS (CHANNEL NUMBER, CHIP NUMBER, BLOCK NUMBER, PAGE NUMBER) |
|---|---|
| 000000 – 3fffff | 0,0,0,0 – 0,0,0,255 |
| 400000 – 7fffff | 1,0,0,0 – 1,0,0,255 |
| 800000 – bfffff | 2,0,0,0 – 2,0,0,255 |
| c00000 – ffffff | 3,0,0,0 – 3,0,0,255 |

111

| LOGICAL ADDRESS | PHYSICAL ADDRESS (CHANNEL NUMBER, CHIP NUMBER, BLOCK NUMBER, PAGE NUMBER) |
|---|---|
| 0 | 0,0,0,0 – 0,0,0,255  1,0,0,0 – 1,0,0,255 |
| 1 | 2,0,0,0 – 2,0,0,255  3,0,0,0 – 3,0,0,255 |
| 2 | 4,0,0,0 – 4,0,0,255  5,0,0,0 – 5,0,0,255 |
| 3 | 6,0,0,0 – 6,0,0,255  7,0,0,0 – 7,0,0,255 |
| ... | ... |

111

| LOGICAL ADDRESS | PHYSICAL ADDRESS (CHANNEL NUMBER, CHIP NUMBER, BLOCK NUMBER, PAGE NUMBER) |
|---|---|
| 0 | 0,0,0,0  1,0,0,0 |
| 1 | 2,0,0,0  3,0,0,0 |
| 2 | 4,0,0,0  5,0,0,0 |
| 3 | 6,0,0,0  7,0,0,0 |
| 4 | 0,1,0,0  1,1,0,0 |
| 5 | 2,1,0,0  3,1,0,0 |
| ... | ... |

111

STORAGE DEVICE, INFORMATION PROCESSING SYSTEM, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-83044, filed on Apr. 24, 2018, the entire contents of which are incorporated herein by reference.

FIELD

The embodiment discussed herein is related to a storage device, an information processing system, and a non-transitory computer-readable storage medium for storing a program.

BACKGROUND

Recently, in regard to solid state drives (SSDs), a software-controlled SSD in which the functions of a flash memory control unit that have previously been implemented by hardware are implemented by software, which enables a flash memory of the SSD to be controlled directly by software, has been proposed. The software-controlled SSD may be referred to as a software-defined SSD.

FIG. 8 is a diagram illustrating a configuration of a software-controlled SSD.

An SSD 300 includes a flash memory controller 302 and flash memories 322-1 to 322-4. As the flash memories 322-1 to 322-4, for example, NOT AND (NAND) flash memories, which are nonvolatile memories, are used.

The flash memory controller 302 includes a host interface (I/F) 331 and flash memory I/Fs 332-1 and 332-2. The flash memory I/F 332-1 is coupled to the host I/F 331 and to the flash memories 322-1 and 322-2, and the flash memory I/F 332-2 is coupled to the host I/F 331 and to the flash memories 322-3 and 322-4.

Hereinafter, any one of the flash memories 322-1 to 322-4 may be referred to as a flash memory 322. Either of the flash memory I/Fs 332-1 and 332-2 may be referred to as a flash memory I/F 332.

The amount by which data is erased in each flash memory 322 is called a block, and the amount by which data is read therefrom or written thereto is called a page. The size of one block is, for example, several megabytes (MB) and the size of one page is, for example, from several kilobytes (kB) to more than 10 kB.

The flash memory I/F 332-1 performs error correction of data read from the flash memories 322-1 and 322-2. In contrast, the flash memory I/F 332-2 performs error correction of data read from the flash memories 322-3 and 322-4.

Data read from the flash memory 322 is input via the flash memory I/F 332 to the host I/F 331.

An application 311 or a library 312, which runs in a host device 301, accesses data in the flash memory 322 by directly specifying a physical address in the flash memory 322 from the software side.

This enables the application 311 or the library 312 to finely control reading data from or writing data to the flash memory 322, enabling its access to data in the flash memory 322 to be optimized to be suitable for the application 311 or the library 312.

Examples of the related art include Japanese Laid-open Patent Publication No. 2018-5686, Japanese Laid-open Patent Publication No. 2003-203486, Japanese Laid-open Patent Publication No. 2010-160605, U.S. Patent Application Publication No. 2010/0174951, and Japanese Laid-open Patent Publication No. 2015-7843.

Examples of the related art also include Jaeyoung Do, Yang-Suk Kee, Jignesh M. Patel, Chanik Park, Kwanghyun Park, David J. DeWitt: "Query Processing on Smart SSDs: Opportunities and Challenges," *SIGMOD'* 13, 2013 *ACM SIGMOD International Conference on Management of Data*, pages 1221-1230, Jun. 22-27, 2013.

SUMMARY

According to an aspect of the embodiments, a storage device includes: a semiconductor memory; and a memory controller coupled to the semiconductor memory and configured to control the semiconductor memory, wherein the memory controller is configured to store information for translating a logical address into a physical address, and execute a dividing process that includes dividing, upon receiving a computational command, the computational command into a plurality of commands based on the information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In such a related-art software-controlled SSD, reading from and writing to the flash memory 322 by the application 311 or the library 312 are performed on a per-page basis. The application 311 manages locations where data to be searched for is stored in the flash memory 322, and therefore the application 311 or the like has to issue a search command for each page of the flash memory 322. For example, there are challenges in which the number of times a command is issued from the host device 301 to the SSD 300 increases and the load on a central processing unit (CPU) of the host device 301 increases.

The page size of a flash memory is generally from several kB to more than 10 kB, and therefore the number of commands issued further increases when the size of data to be accessed is large.

For example, for a page size of 8 kB, when the data size is 8 MB, the number of commands issued corresponds to 1024 pages, and when the data size is 8 GB, the number of commands issued corresponds to about 1,050,000 (=1024× 1024) pages.

It is an aspect of the embodiment discussed herein to make it possible to reduce the number of issued commands to lighten the load.

Hereinafter, an embodiment according to a storage device, an information processing program, and an information processing system will be described with reference to the accompanying drawings. The embodiment described hereinafter is merely exemplary and is in no way intended to exclude various modifications and technical applications that are not explicitly described in the embodiment. For example, the embodiment may be carried out with various modifications (such as by combining the embodiment with modifications) without departing from the scope of the gist thereof. The drawings do not purport to only include elements illustrated therein but may include other functions and the like.

(A) Configuration

Figure 1:
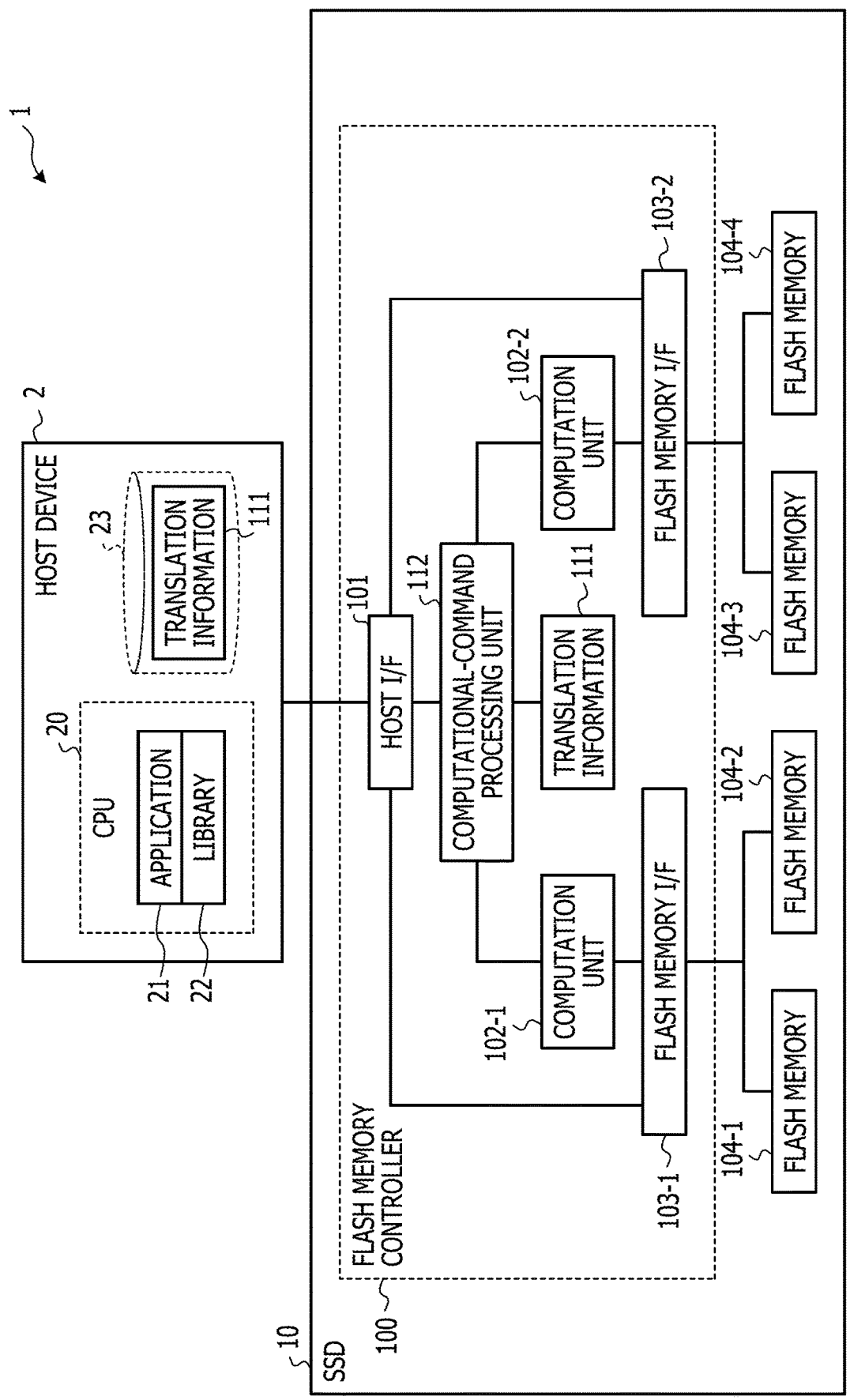
FIG. 1 is a diagram illustrating a configuration of an information processing system, by way of example, according to an embodiment.

FIG. 1 is a diagram illustrating a configuration of an information processing system 1 including a software-defined SSD 10, by way of example, according to an embodiment. The information processing system 1 illustrated in FIG. 1 includes a host device 2 and the software-defined SSD 10 and may be applied to various techniques such as big data processing, database appliances, and storage systems.

<Host Device>

The host device 2, which is an information processing device having, for example, server capabilities, includes a CPU 20 and a storage device 23 and is communicably coupled to the software-defined SSD 10.

The storage device 23 is, for example, a memory or a hard disk drive (HDD) and stores therein various types of data, an operating system, and programs. Translation information 111 is stored in the storage device 23.

The translation information 111 is information that associates physical addresses with logical addresses in the SSD 10.

Figure 2:
FIG. 2 is a diagram illustrating translation information in an information processing system, by way of example, according to an embodiment.

FIG. 2 is a diagram illustrating the translation information 111 in the information processing system 1, by way of example, according to an embodiment.

In the translation information 111 illustrated in FIG. 2, logical addresses are expressed in hexadecimal notation and are expressed in logical block addressing (LBA) format. A physical address is physical location information in the SSD 10 and is represented by a combination of a channel number, a chip number, a block number, and a page number.

In the example illustrated in FIG. 2, for example, logical addresses "000000-3fffff" correspond to physical addresses "0,0,0,0-0,0,0,255".

The translation information 111 is transmitted together with a setting command for saving the translation information 111 in a storage device (not illustrated), such as a register of the SSD 10, from the host device 2 to the SSD 10.

The translation information 111 is, for example, updated each time writing to the flash memory 104 is performed in the SSD 10.

Upon update of the translation information 111, it is desirable that the host device 2 quickly transmit the updated translation information 111 together with the setting command to the SSD 10.

In the SSD 10, a computational-command processing unit 112 described hereinafter stores the translation information 111 transmitted from the host device 2 in a storage device such as a register (not illustrated).

The CPU 20, which is a processing device that performs various types of control and computations, for example, runs the application 21 or the library 22 to access a storage area provided by the software-defined SSD 10 for writing data thereto or reading data therefrom. The application 21 or the library 22 may be referred to simply as the application 21 or the like hereinafter.

The application 21 or the like manages physical information of the SSD 10 and controls wear leveling and garbage collection. This enables data to be distributed across the flash memories 104-1 to 104-4 of the SSD 10, achieving high-speed reading processing with high throughput and low latency.

In the case of registering data in the SSD 10, the host device 2 writes data such that the data is distributed across a plurality of flash memories 104, and records the addresses at which the data is written. For example, the application 21 or the like in the host device 2 issues to the SSD 10 a data access instruction for the purpose of writing thereto.

For example, in the case of using data registered in the SSD 10, the host device 2 issues a read instruction or a computational instruction to the SSD 10.

In the host device 2, the application 21 or the like issues to the SSD 10 a computational instruction (computational command) for performing a computation.

Examples of computations to be performed according to computational instructions include a search for data stored in the flash memories 104-1 to 104-4 in the SSD 10 and statistical computations for data. In the information processing system 1, a computational command issued to the SSD 10 by the application 21 or the like may be a computational instruction that specifies a region to be accessed by using logical addresses (LBA).

An example where the computation is a search will now be described. For example, the application 21 or the like of the host device 2 issues a search command as a computational command to the SSD 10.

In such a search command, an instruction for searching for a keyword may be given such that a region to be searched (access destination) in the storage areas of the flash memories 104-1 to 104-4 of the SSD 10 is specified by using logical addresses.

In using a related-art software-controlled SSD, the application 21 or the like of the host device 2 issues, to the SSD 10, a computational command on a per-page basis in the SSD 10. For example, when a region of a plurality of pages is to be searched, the same number of search commands as the number of pages to be searched are issued. The page is a region whose size is an amount by which data is written to or read from the flash memory 104 (a data access size or a read and write size), and generally has a data size from several kB to more than 10 kB.

In contrast, in the information processing system 1, the application 21 or the like of the host device 2 may issue a single computational command that specifies an access destination by using logical addresses, instead of issuing multiple computational commands on a per-page basis to the software-controlled SSD 10. A computational command that specifies an access destination by using logical addresses issued from the application 21 or the library 22 may be referred to as a range-specific computational command (a first computational command) hereinafter.

In the information processing system 1, the application 21 or the library 22 of the host device 2 may issue a single range-specific computational command with an access destination of a plurality of pages.

For example, the application 21 or the library 22 of the host device 2 issues, to the SSD 10, a single search command to search a range (access destination) beginning with a logical address "000000" and having a size "0x100000".

When registering data in the SSD 10, the host device 2 writes data such that the data is distributed across a plurality of flash memories 104 and records addresses at which the data is written. In contrast, when using data registered in the SSD 10, the host device 2 issues a read instruction or a computational instruction to the SSD 10.

The host device 2 also has functions of transmitting the translation information 111 stored in the storage device 23 to the flash memory controller 100 and issuing a setting command for storing the translation information 111 in a register or the like of the flash memory controller 100.

<SSD>

The software-defined SSD 10 includes the flash memory controller 100 and one or more (four in the example illustrated in FIG. 1) flash memories 104-1 to 104-4. The software-defined SSD 10 may be referred to simply as the SSD 10 hereinafter.

The flash memories 104-1 to 104-4 are semiconductor memories. As the flash memories 104-1 to 104-4, for example, NAND flash memories, which are nonvolatile memories, are used.

Hereinafter, as a reference numeral denoting a flash memory, a reference numeral "104-1", "104-2", "104-3", or "104-4" will be used when it is desired that one of a plurality of flash memories be identified, and a reference numeral "104" will be used when any flash memory is referred to.

In the flash memory 104, data is written or read on a per-page basis (for example, several kB to more than 10 kB) and data is erased on a per-block basis (for example, several MB).

The flash memory controller 100 controls access to data in the flash memories 104-1 to 104-4. The flash memory controller 100 includes a host I/F 101, flash memory I/Fs 103-1 and 103-2, the computational-command processing unit 112, the translation information 111, and one or more (two in the example illustrated in FIG. 1) computation units 102-1 and 102-2.

The host I/F 101 is coupled to the host device 2, the flash memory I/Fs 103-1 and 103-2, and computational-command processing unit 112. The flash memory I/F 103-1 is coupled to the host I/F 101, the computation unit 102-1, and the flash memories 104-1 and 104-2. The flash memory I/F 103-2 is coupled to the host I/F 101, the computation unit 102-2, and the flash memories 104-3 and 104-4.

Hereinafter, as a reference numeral denoting a flash memory I/F, a reference numeral "103-1" or "103-2" will be used when it is desired that one of a plurality of flash memory I/Fs be identified, and a reference numeral "103" will be used when any flash memory I/F is referred to. Furthermore, as a reference numeral denoting a computation unit, a reference numeral "102-1" or "102-2" will be used when it is desired that one of a plurality of computation units be identified, and a reference numeral "102" will be used when any computation unit is referred to.

As the flash memories 104-1 to 104-4, for example, NAND flash memories, which are nonvolatile memories, are used.

The host I/F 101 controls communication with the host device 2.

For example, upon receiving a read instruction from the host device 2, the host I/F 101 outputs a read instruction with a specified data transfer destination to the flash memory I/F 103 corresponding to the flash memory 104 to be accessed. The host I/F 101 transfers data received from the flash memory I/F 103 to the host device 2.

The computation unit 102 performs a predetermined computation for data. The functions of the computation unit 102 may be achieved by, for example, a circuit device.

Examples of computations performed by the computation unit 102 include a search for data stored in the flash memory 104 and statistical computations for data.

The computation unit 102 may be implemented by a combination of known circuit devices for achieving these functions.

As described above, in the present embodiment, an example where the computation unit 102 searches for data stored in the flash memory 104 is presented.

The computation unit 102 processes (computes) data stored in the flash memory 104 on a per-page basis according to a per-page computational command received from the computational-command processing unit 112 described hereinafter.

The computation unit 102 performs a computation by using data received from the flash memory I/F 103 and outputs a computation result to the computational-command processing unit 112.

In the present embodiment, the SSD 10 includes the computation unit 102, and a computation, which is performed in a host device in a related-art technique, is performed by the computation unit 102, so that near data processing, where a computation is performed near data (the flash memory 104), is implemented.

In such near data processing, the cost of moving data from the SSD 10 to the host device 2 is reduced, which may achieve increased performance and power saving. In addition, the load caused by computations in the host device 2 may be reduced.

The flash memory I/F 103 controls communication between the flash memory 104 and the memory controller 100. For example, the flash memory I/F 103-1 controls communication between the flash memory controller 100 and the flash memory 104-1 or 104-2. The flash memory I/F 103-2 controls communication between the flash memory controller 100 and the flash memory 104-3 or 104-4.

For example, upon receiving a read instruction from the host device 2 via the host I/F 101, the flash memory I/F 103 outputs a read instruction to the flash memory 104, and the flash memory 104 outputs data to the flash memory I/F 103. The flash memory I/F 103 outputs the data received from the flash memory 104 to the host I/F 101.

In addition, the flash memory I/F 103-1 performs error correction of data read from the flash memory 104-1 and the flash memory 104-2. In contrast, the flash memory I/F 103-2 performs error correction of data read from the flash memory 104-3 and the flash memory 104-4.

Furthermore, the flash memory I/F 103 outputs data received from the flash memory 104 to the computation unit 102.

Based on a range-specific computational command (first computational command) received from the host device 2, the computational-command processing unit 112 creates a plurality of commands (second computational commands) to be executed by the computation units 102. Based on a single range-specific computational command issued by the host device 2, which specifies an access destination in the flash memories 104 by using logical addresses, the computational-command processing unit 112 creates a plurality of computational commands that specify access destinations in the flash memories 104 on a per-page basis.

For example, the computational-command processing unit 112 references the translation information 111 based on logical addresses included in the range-specific computational command to translate the logical addresses into physical addresses, and creates a plurality of computational commands (on a per-page basis) that specify pages at the physical addresses as access destinations. Computational commands on a per-page basis created based on a range-specific computational command may be referred to as per-page computational commands hereinafter.

It may be said that the computational-command processing unit 112 divides a single range-specific computational command into a plurality of per-page computational commands by dividing the access destination of the range-specific computational command on a per-page basis.

For example, with the translation information 111 illustrated in FIG. 2, an example where per-page computational commands are created based on a computational command (range-specific computational command) that specifies, as a region to be processed, a storage area beginning with a logical address "000000" and having a size of 0x1000000 (16 mebibytes (MiB)) will be presented.

It is assumed that one block consists of 256 pages and the size of one page is 16 kibibytes (KiB).

By referencing the translation information 111, the computational-command processing unit 112 translates logical addresses of the range-specific computational command into physical addresses.

Thus, logical addresses "000000-3fffff" are translated into physical addresses "(0,0,0,0)-(0,0,0,255)".

Likewise, logical addresses "400000-7fffff" are translated into physical addresses "(1,0,0,0)-(1,0,0,255)", logical addresses "800000-bfffff" into physical addresses "(2,0,0,0)-(2,0,0,255)", and logical addresses "c00000-ffffff" into physical addresses "(3,0,0,0)-(3,0,0,255)".

The computational-command processing unit 112 references physical addresses resulting from translation and creates computational commands in which pages at the physical addresses are the respective access destinations, creating computational commands on a per-page basis (per-page computational commands).

The computational-command processing unit 112 creates a per-page read command for each of pages included in a physical address range corresponding to a logical address range.

In this example, the computational-command processing unit 112 creates 1024 per-page computational commands corresponding to the following pages.

(0,0,0,0), (0,0,0,1), . . . , (0,0,0,255)
(1,0,0,0), (1,0,0,1), . . . , (1,0,0,255)
(2,0,0,0), (2,0,0,1), . . . , (2,0,0,255)
(3,0,0,0), (3,0,0,1), . . . , (3,0,0,255)

In the present embodiment, since the computational command is a search command for performing a keyword search of a specified range, the computational-command processing unit 112 creates 1024 per-page read commands and 1024 per-page search commands whose regions to be processed are the respective pages mentioned above.

The per-page read command is a command for reading data on a per-page basis from the flash memory 104. Issuing the per-page read command to the flash memory I/F 103 allows the flash memory I/F 103 to read, from the flash memory 104, data of the page specified as a region to be processed.

The per-page search command is a command for searching per-page data read by a per-page read command. Issuing the per-page search command to the computation unit 102 allows the computation unit 102 to search per-page data read from the flash memory 104 by using a keyword set in advance.

It may be said that the computational-command processing unit 112 divides a range-specific computational command to create a plurality of per-page computational commands (per-page read commands, per-page search commands).

The computational-command processing unit 112 issues created per-page read commands to the flash memory I/F 103.

The computational-command processing unit 112 has a function of transferring a computation result received from the computation unit 102 to the host device 2.

(B) Operations

Figure 3:
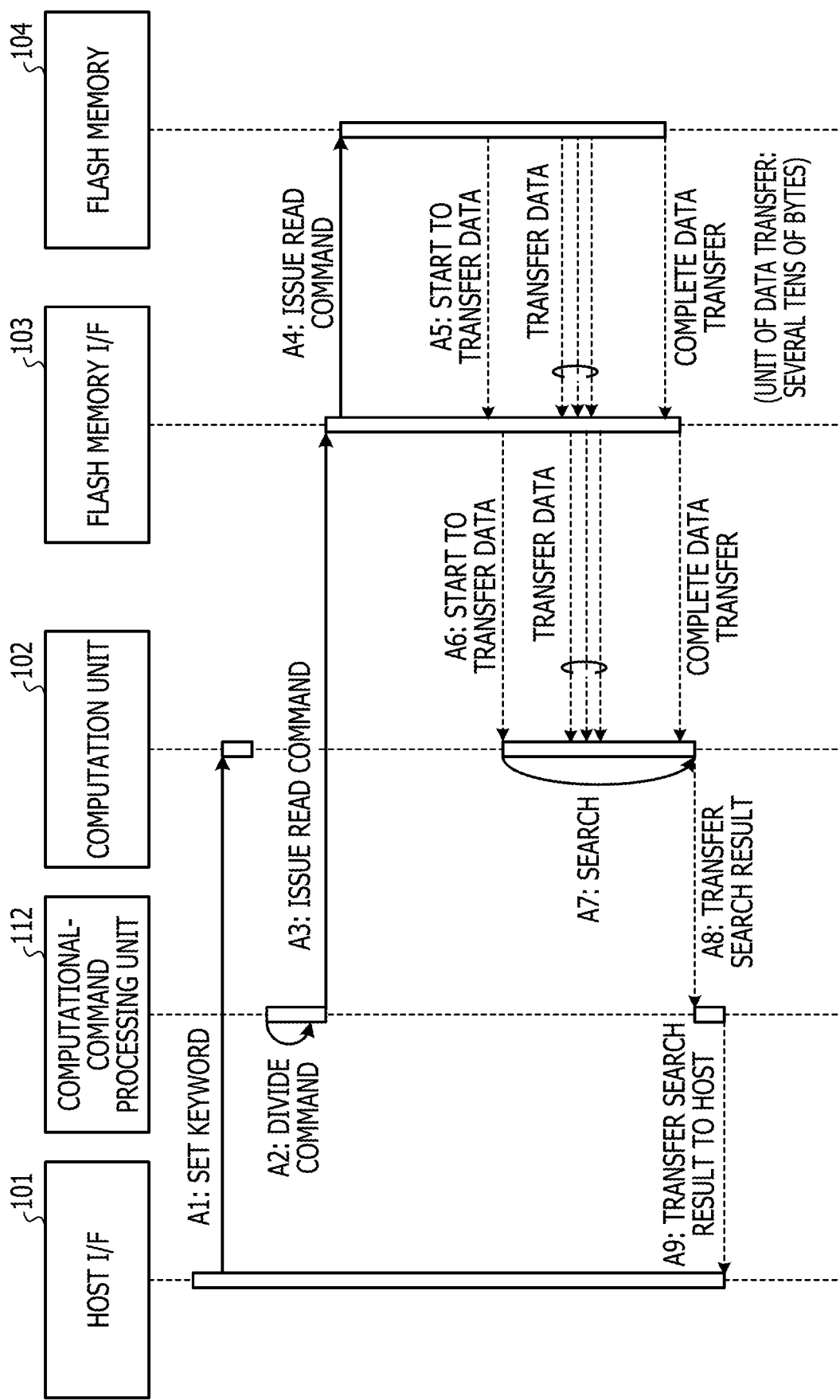
FIG. 3 is a sequence diagram illustrating an outline of processing of units during computational processing in an SSD of an information processing system, by way of example, according to an embodiment.

The outline of processing of units during computational processing in the SSD 10 of the information processing system 1, by way of example, according to an embodiment, which is configured as described above, will be described with reference to a sequence diagram illustrated in FIG. 3.

Prior to this processing, the host device 2 issues to the SSD 10 a setting command for storing the translation information 111, and the host I/F 101 transfers the translation information 111 received from the host device 2 to the computational-command processing unit 112. The computational-command processing unit 112 stores the transferred translation information 111 in a storage device such as a register (not illustrated).

The host device 2 issues a search command as a computational command together with a keyword, which is a search key, to the SSD 10. The search command is a range-specific computational command that provides an instruction for search in such a manner that a region to be accessed is specified by using logical addresses. The computation unit 102 stores a keyword received from the host I/F 101 in a storage device such as a register.

The host I/F 101 sets a keyword for the computation unit 102. The keyword is, for example, stored in a storage device such as a register (not illustrated) (refer to arrow A1).

The computational-command processing unit 112 creates a plurality of per-page computational commands (per-page read commands) based on (or by dividing) a range-specific computational command (search command) received by the host I/F 101 (refer to arrow A2).

For example, the computational-command processing unit 112 references the translation information 111 based on logical addresses included in the range-specific computational command to translate a region to be processed into the physical addresses so as to divide the region into a plurality of pages.

The computational-command processing unit 112 creates a plurality of per-page read commands, for example, by sequentially replacing a processing target of a computational command received from the host device 2 with a plurality of pages obtained by dividing the processing target.

The computational-command processing unit 112 issues the created plurality of per-page read commands to the flash memory I/F 103 (refer to arrow A3). At such a time, the transfer destination of data read from the flash memory 104 is set to the computation unit 102.

The flash memory I/F 103 issues a per-page read command to the flash memory 104 (refer to arrow A4). Thus, data starts to be read page by page from the flash memory 104. The data read from the flash memory 104 is transferred to the flash memory I/F 103 (refer to arrow A5).

The flash memory I/F 103 transfers, to the computation unit 102, data transferred from the flash memory 104 as a response to a per-page read command issued to the flash memory 104 (refer to arrow A6).

The data transfer from the flash memory 104 to the computation unit 102 is, for example, performed in units of several tens of bytes.

Upon receiving a completion notification (completion of reading) from the flash memory 104, the flash memory I/F 103 transmits the completion notification (completion of reading) to the host I/F 101.

The computation unit 102 searches data transferred from the flash memory 104 by using the set keyword (refer to arrow A7). For example, the computation unit 102 examines whether, in data received from the flash memory I/F 103, data that matches the keyword is present. If data that matches the keyword is found, the location of the data is recorded in a storage device such as a register.

Upon completion of data transfer, the computation unit 102 transfers a search result to the computational-command processing unit 112 (refer to arrow A8). The computation unit 102 may collectively transfer responses to a plurality of per-page read commands to the computational-command processing unit 112. The computation unit 102 may also transfer responses to a plurality of per-page read commands to the computational-command processing unit 112 one by one each time one of the responses is transferred from the flash memory I/F 103.

The computational-command processing unit 112 responds to the host device 2 via the host I/F 101 with a search result transferred from the computation unit 102 (refer to arrow A9).

Figure 4:
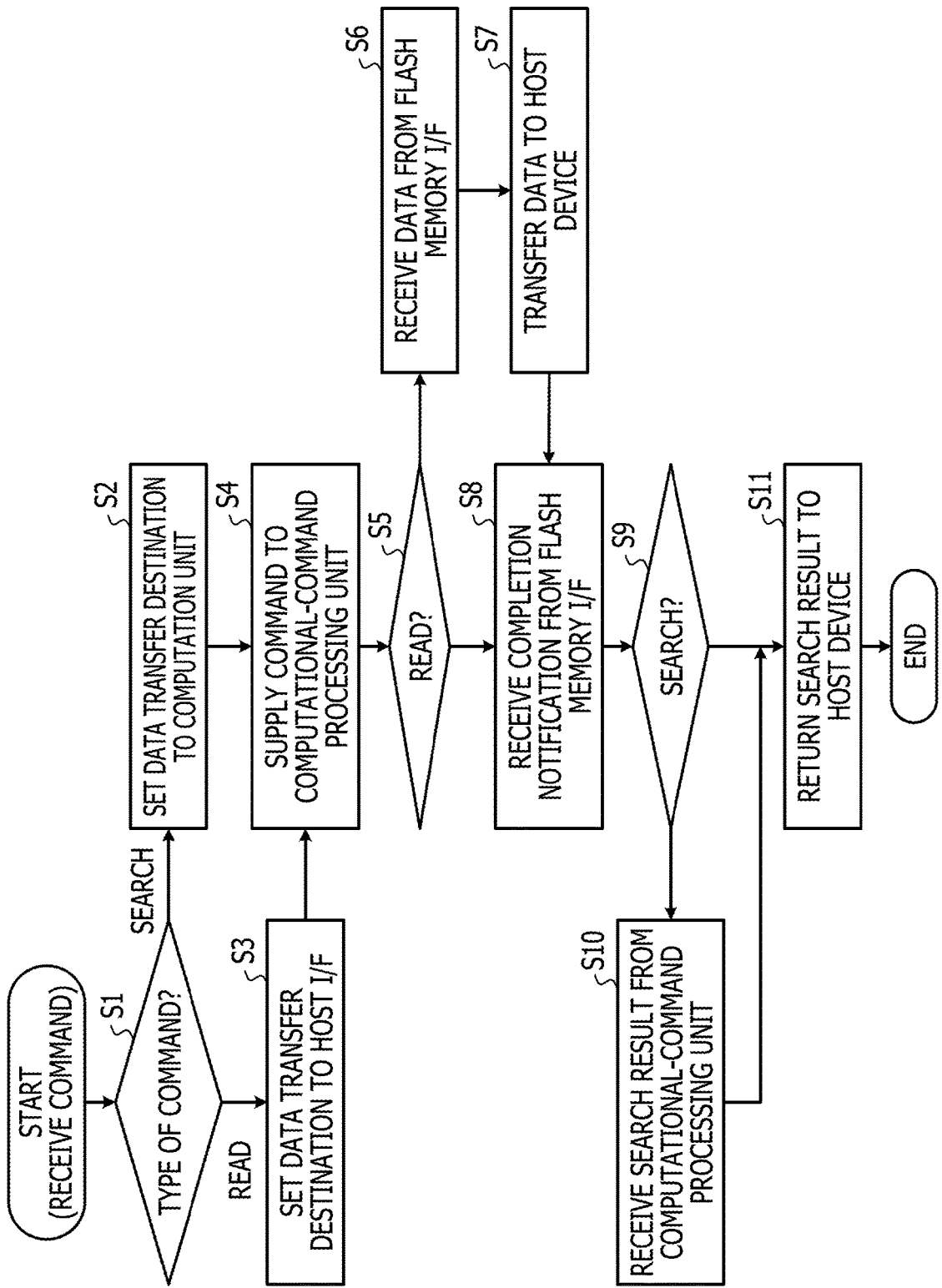
FIG. 4 is a flowchart illustrating a process performed by a host I/F in an information processing system, by way of example, according to an embodiment.

A process performed by the host I/F 101 in the information processing system 1, by way of example, according to an embodiment will now be described according to a flowchart (steps S1 to S11) illustrated in FIG. 4.

Upon receiving a command from the host device 2, the host I/F 101 checks the type of the received command (step S1).

If, as a result of checking in step S1, the received command is a search command (range-specific search command) (refer to the "search" route in step S1), the process proceeds to step S2.

In step S2, the host I/F 101 sets a data (response data) transfer destination to the computation unit 102.

However, if, as a result of checking in step S1, the received command is a read command (refer to the "read" route in step S1), the process proceeds to step S3. In step S3, the host I/F 101 sets the host I/F 101 as a data (response data) transfer destination. For example, the host I/F 101 outputs a read instruction in which the host I/F 101 is specified as a data transfer destination, to the flash memory I/F 103 corresponding to the flash memory 104 to be accessed.

In step S4, the host I/F 101 supplies the command received from the host device 2 to the computational-command processing unit 112.

In step S5, the host I/F 101 checks whether the command received from the host device 2 is a read command. If, as a result of checking, the command is not a read command (refer to the No route in step S5), the process proceeds to step S8.

However, if, as a result of checking in step S5, the command is a read command (refer to the Yes route in step S5), the process proceeds to step S6. The host I/F 101 receives data from the flash memory I/F 103 (step S6) and transfers the received data to the host device 2 (step S7).

In step S8, when the flash memory I/F 103 has completed transferring all the data, the host I/F 101 receives a completion notification from this flash memory I/F 103.

In step S9, the host I/F 101 checks whether a command received from the host device 2 is a search command. If, as a result of checking, the command is a search command (refer to the Yes route in step S9), the process proceeds to step S10.

In step S10, the host I/F 101 receives a search result from the computational-command processing unit 112 and, in step S11, responds to the host device 2 with the search result.

If, as a result of checking in step S9, the command is not a search command (refer to the No route in step S9), in step S11, the host I/F 101 responds to the host device 2, for example, with a command status indicating a result (success or failure) for a read command or a write command.

(C) Effects

In this way, according to the information processing system 1, by way of example, according to an embodiment, the flash memory controller 100 of the SSD 10 includes the computational-command processing unit 112, and creates a plurality of per-page read commands based on a range-specific computational command issued from the host device 2.

Thus, just sending a single range-specific computational command in the host device 2 enables computational processing of a plurality of pages to be performed in the software-defined SSD 10. Accordingly, the number of times a command is issued from the host device 2 to the software-defined SSD 10 may be reduced, and the load on the CPU 20 of the host device 2 may be reduced.

For example, for the case where the size of computation target data is 16 MiB and the per-page read command size is 16 KiB, while the host device 2 issues 16 MiB/16 KiB=1024 computational commands in a related-art technique, it is sufficient in the information processing system 1 that a single range-specific computational command be issued.

In addition, reducing the load of issuing commands on the CPU 20 in the host device 2 enables the CPU 20 to perform other tasks, enabling the entire processing of the host device 2 to be faster.

Furthermore, reducing the load on the host device 2 may reduce power consumption.

(D) Others

Disclosed techniques are not limited to the embodiment described above and may be carried out with various modifications without departing from the scope of the gist thereof. Configurations and processing of the present embodiment may be suitably selected if desired or may also be used in combination as appropriate.

For example, the number of pieces of the translation information 111 provided for the SSD 10 is not limited to one but may be plural. For example, the translation information 111 may be included for each application 21 or for each virtual machine (VM).

When plural pieces of translation information 111 are included, it is desirable that the application 21 or the library 22 in the host device 2 specify one piece of the translation information 111 to be used by the computational-command processing unit 112 and transfer a range-specific computational command.

In the embodiment described above, the host device 2 manages the translation information 111 such that the host device 2 transfers the entire translation information 111 to the SSD 10 in advance to store the translation information 111 in a register or the like of the flash memory controller 100; however, management of the translation information 111 is not limited to this.

The host device 2 may extract, from the translation information 111, only a part corresponding to a region for which a computational command is to be executed, and transfer the extracted part to the SSD 10. Of the translation information 111, the part corresponding to a region for which a computational command is to be executed may be referred to as partial translation information 111 hereinafter.

Figure 5:
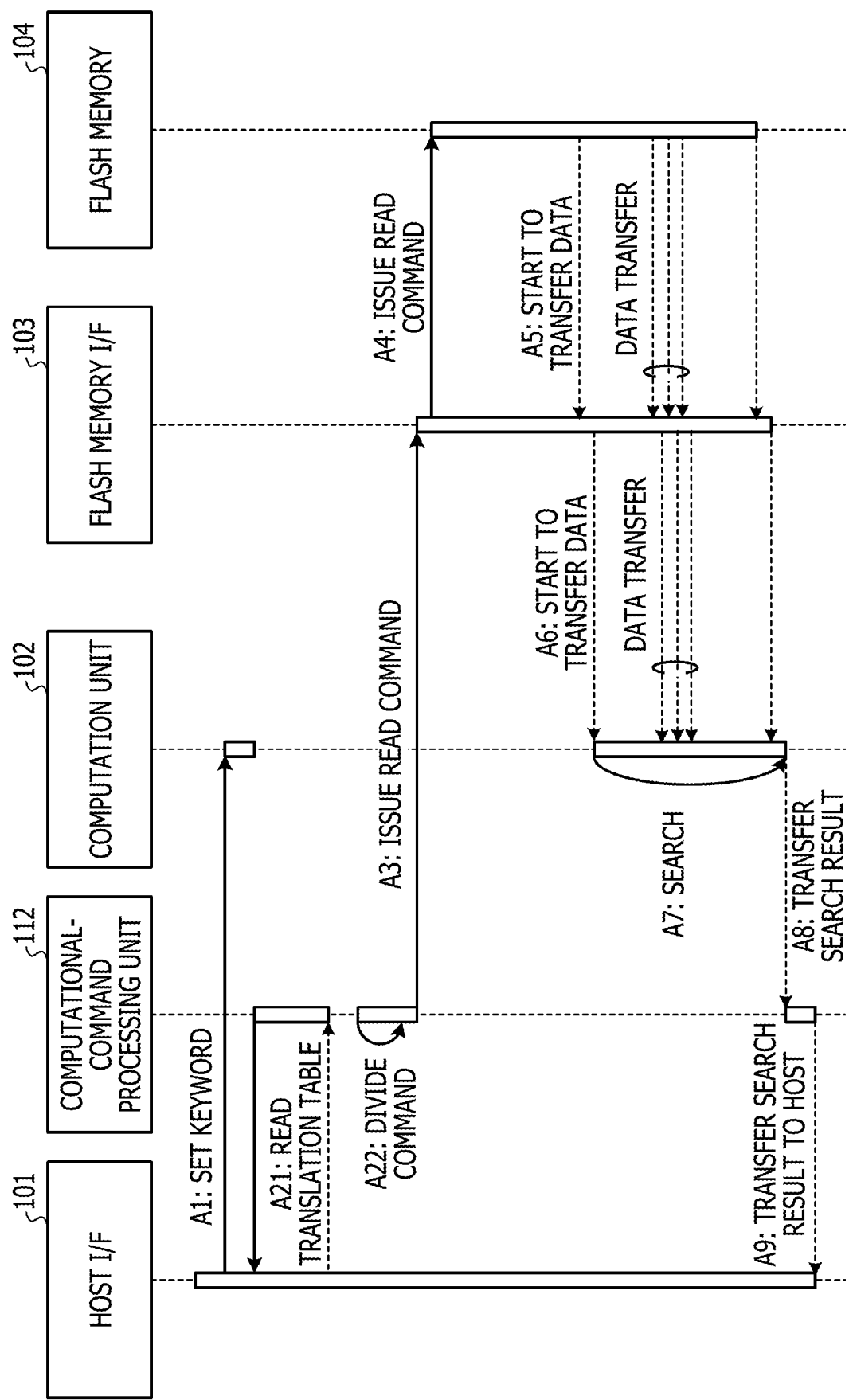
FIG. 5 is a sequence diagram illustrating an outline of a modification of processing of units during computational processing in an SSD of an information processing system, by way of example, according to an embodiment.

FIG. 5 is a sequence diagram illustrating an outline of a modification of processing of each unit during computational processing in the SSD 10 of the information processing system 1, by way of example, according to an embodiment.

In the drawing, processing denoted by the same reference letters as those described above is similar processing and description thereof is omitted.

In the present modification, after the host I/F 101 sets a keyword for the computation unit 102 (refer to arrow A1), the computational-command processing unit 112 reads, from the host I/F 101, the partial translation information 111 transmitted from the host device 2 (refer to arrow A21) and stores the read partial translation information 111 in a register or the like.

Thereafter, based on (by dividing) a range-specific computational command (search command) received by the host I/F 101, the computational-command processing unit 112 creates a plurality of per-page computational commands (per-page read commands) (refer to arrow A22).

For example, by referencing the partial translation information 111 based on logical addresses included in the range-specific computational command, the computational-command processing unit 112 translates a region to be processed into physical addresses to divide the region into a plurality of pages.

The computational-command processing unit 112 creates a plurality of per-page read commands, for example, by sequentially replacing a processing target of a computational command received from the host device 2 with a plurality of pages obtained by dividing the target.

In the present modification, instead of transferring the entire translation information 111, transferring only part thereof from the host device 2 to the SSD 10 may reduce the time taken for transfer and the load on a communication band and the like. Instead of transferring the entire translation information 111, transferring only part thereof is particularly effective for cases where writing to the flash memory 104 is frequently performed and the translation information 111 is updated at a high frequency.

The host device 2 may transfer a part of the translation information 111, which corresponds to a region for which a range-specific computational command is to be executed, prior to issuing the range-specific computational command or may transfer the part of the translation information 111 together with the range-specific computational command to the SSD 10.

In the translation information 111 illustrated in FIG. 2, one physical address corresponds to one logical address; however, the relationship between physical addresses and logical addresses is not limited to this and may be carried out with various modifications.

Figure 6:
FIG. 6 is a diagram illustrating a modification of translation information in an information processing system, by way of example, according to an embodiment.
Figure 7:
FIG. 7 is a diagram illustrating a modification of translation information in an information processing system, by way of example, according to an embodiment.
Figure 8:
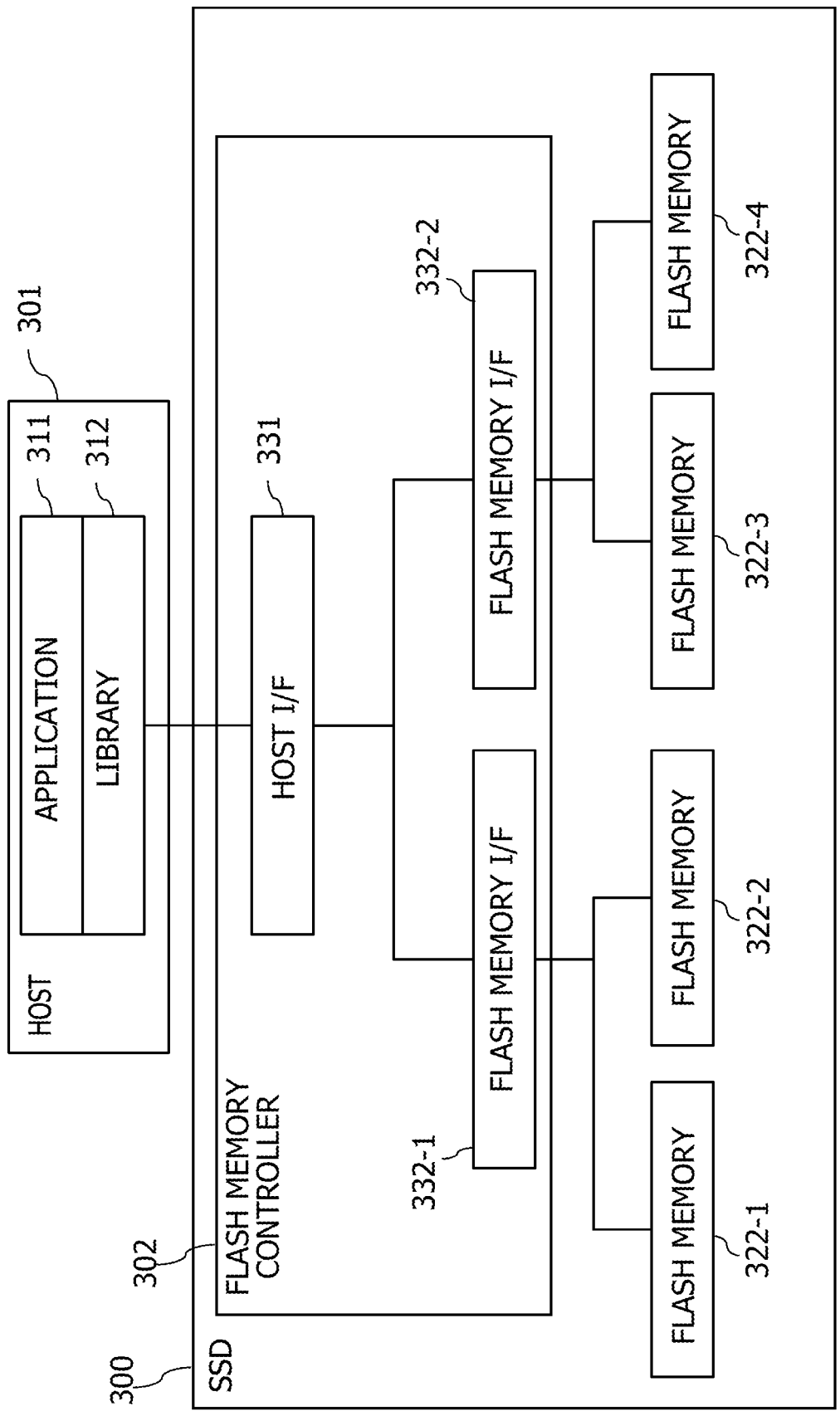
FIG. 8 is a diagram illustrating a configuration of a software-controlled SSD.

FIG. 6 and FIG. 7 are diagrams illustrating modifications of the translation information 111 in the information processing system 1, by way of example, according to an embodiment.

In the translation information 111, any addressing is available for logical addresses. In the translation information 111 illustrated in FIG. 6, physical addresses in a plurality of (two in the example illustrated in FIG. 6) regions are associated with one logical address.

Thus, the application 21 or the library 22 in the host device 2 issues a range-specific computational command using one logical address, and thereby, in the SSD 10, the computational-command processing unit 112 issues per-page read commands respectively corresponding to the two regions.

In the example illustrated in FIG. 6, for example, if the application 21 or the library 22 in the host device 2 issues a range-specific computational command using one logical address "0", then, in the SSD 10, the computational-command processing unit 112 creates per-page read commands for the respective pages included in each of ranges of physical addresses "0,0,0,0-0,0,0,255" and "1,0,0,0-1,0,0,255".

In the translation information 111 illustrated in FIG. 7, physical addresses of two pages are associated with one logical address.

In the example illustrated in FIG. 7, for example, if the application 21 or the library 22 in the host device 2 issues a range-specific computational command using one logical address "0", then, in the SSD 10, the computational-command processing unit 112 creates per-page read commands for the respective pages of physical addresses "0,0,0,0" and "1,0,0,0".

In the embodiment and modifications described above, at least part of the computational-command processing unit 112 and the computation unit 102 may be implemented by a combination of known circuit devices for achieving functions described above.

The functions of the computational-command processing unit 112 and the computation unit 102 may be achieved by a processor (not illustrated) such as a CPU or a microprocessor unit (MPU) executing programs (an information processing program and a computational program) and may be carried out with various modifications.

Programs for achieving the functions of the computational-command processing unit 112 and the computation unit 102 are provided, for example, in a form in which the programs are recorded on a computer-readable recording medium such as a floppy disk, a compact disc (CD) such as a CD-read-only memory (ROM), a CD-recordable (R), a CD-rewritable (RW), or the like, a digital versatile disc (DVD) such as a DVD-ROM, a DVD-random access memory (RAM), a DVD-R, a DVD+R, a DVD-RW, a DVD+RW, a high-definition (HD) DVD, or the like, a Blu-ray disc, a magnetic disk, an optical disc, or a magneto-optical disc. A computer reads the programs from the recording medium and transfers and stores the programs in an internal storage device or an external storage device, so that the computer uses the programs. The programs may be recorded, for example, in a storage device (on a recording medium) such as a magnetic disk, an optical disc, or a magneto-optical disc and be provided from the storage device via a communication path to a computer.

In achieving the functions of the computational-command processing unit 112 and the computation unit 102, programs stored in an internal storage device (a memory, which is not illustrated in the drawing, in the SSD 10 in the present embodiment) are executed by a microprocessor of a computer (a processor of the SSD 10 in the present embodiment). At this point, programs recorded on a recording medium may be read and executed by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A software defined solid state device (SSD) comprising:
    an interface configured to be coupled to a host device;
    a semiconductor memory; and
    a memory controller coupled to the semiconductor memory, the memory controller being configured to:
    receive translation information from the host device through the interface, the translation information indicating a relation between a logical address and one or more physical addresses;
    receive a computational command from the host device through the interface, the computational command including region information indicating a target region defined by a first logical address and a data size, the target region having a data space larger than a predetermined size; and
    divide the received computational command into a plurality of commands based on the region information and the received translation information by converting the first logical address into corresponding one or more physical addresses in accordance with the received translation information, each of the plurality of commands being a command associated with a respective subregion divided from the target region, the respective subregion having a data space equal to or less than the predetermined size.

2. The software defined SSD according to claim 1, wherein the memory controller is configured to
    create a plurality of second computational commands based on a single first computational command that specifies an address destination in the semiconductor memory by using a logical address, each of the plurality of second computational commands being configured to specify access destinations in the semiconductor memory on a per-data access size basis, and
    in accordance with the second computational command, process data stored in the semiconductor memory on the per-data access size basis.

3. The software defined SSD according to claim 1, wherein the memory controller is configured to receive the information from a transmission source device of the computational command.

4. The software defined SSD according to claim 3, wherein the memory controller is configured to receive, prior to executing the computational command, a part of the information to be used for processing of the computational command, from the transmission source device of the computational command.

5. A system comprising:
    an information processing device configured to issue a computational command; and
    a software defined solid state device (SSD) coupled to the information processing device, the software defined SSD including an interface configured to be coupled to the information processing device, a semiconductor memory, and a memory controller, the memory controller being configured to:
    receive translation information from the information processing device through the interface, the translation information indicating a relation between a logical address and one or more physical addresses;
    receive a computational command from the information processing device through the interface, the computational command including region information indicating a target region defined by a first logical address and a data size, the target region having a data space larger than a predetermined size; and
    divide the received computational command into a plurality of commands based on the region information and the received translation information by converting the first logical address into corresponding one or more physical addresses in accordance with the received translation information, each of the plurality of commands being a command associated with a respective subregion divided from the target region, the respective subregion having a data space equal to or less than the predetermined size.

6. A non-transitory computer-readable storage medium for storing a program which causes a processor of a software defined solid state device (SSD) to perform processing for controlling a semiconductor memory of the software defined SSD, the processing comprising:
    receive translation information from a host device through the interface, the translation information indicating a relation between a logical address and one or more physical addresses;
    receiving a computational command from the host device through the interface, the computational command including region information indicating a target region defined by a first logical address and a data size, the target region having a data space larger than a predetermined size; and
    dividing the received computational command into a plurality of commands based on the region information and the received translation information by converting the first logical address into corresponding one or more physical addresses in accordance with the received translation information, each of the plurality of commands being a command associated with a respective subregion divided from the target region, the respective subregion having a data space equal to or less than the predetermined size.

* * * * *